United States Patent [19]

Baker

[11] Patent Number: 5,149,429
[45] Date of Patent: Sep. 22, 1992

[54] FILTER FOR REMOVING CONTAMINANTS FROM REFRIGERANT

[76] Inventor: Norman L. Baker, 104, 438 Victoria Avenue East, Regina, Saskatchewan, Canada, S4N 0N7

[21] Appl. No.: 707,046

[22] Filed: May 29, 1991

[30] Foreign Application Priority Data

Aug. 27, 1990 [CA] Canada ................................. 2024022

[51] Int. Cl.$^5$ ............................................. B01D 24/12
[52] U.S. Cl. ............................. 210/291; 210/321.75; 210/DIG. 6; 55/316; 55/274; 62/474
[58] Field of Search ........... 210/321.6, 321.75, 321.84, 210/190, 295, 486, DIG. 6, 291, 446; 62/112, 149, 195, 292, 474, 85; 55/316, 33, 74, 274

[56] References Cited

U.S. PATENT DOCUMENTS

| | | | |
|---|---|---|---|
| 2,248,131 | 6/1941 | Smith | 210/204 |
| 2,374,755 | 5/1945 | Kisch | 210/190 |
| 3,464,186 | 2/1967 | Hankison et al. | 55/316 |
| 3,555,787 | 8/1968 | Lustig | 55/316 |
| 3,572,050 | 3/1971 | Bottum | 62/195 |
| 4,178,249 | 12/1979 | Councill | 210/289 |
| 4,396,209 | 8/1983 | Tsuge et al. | 55/316 |
| 4,572,725 | 2/1986 | Kosima | 55/274 |
| 4,574,874 | 3/1986 | Durary | 62/112 |
| 4,637,881 | 1/1987 | Sciuto | 62/474 |
| 4,671,868 | 6/1987 | Ottrok | 209/48 |
| 4,762,536 | 8/1988 | Purtschert | 55/316 |
| 4,768,355 | 9/1988 | Breuhan et al. | 62/474 |
| 4,811,571 | 3/1989 | Mayer | 62/474 |
| 5,044,166 | 9/1991 | Wijmans et al. | 62/85 |

Primary Examiner—Robert A. Dawson
Assistant Examiner—Anam Fortuna
Attorney, Agent, or Firm—Beveridge, DeGrandi & Weilacher

[57] ABSTRACT

A filter for removing contaminants from refrigerant, consisting of an elongate closed container having a first end, a second end and an interior. An inlet is positioned adjacent to the first end. An outlet is positioned adjacent to the second end. Desiccant substantially fills the interior of the container. A plurality of liquid impervious and vapor flow retarding membranes are positioned transversely within the interior of the container forming vapour barriers. The desiccant is divided into a plurality of layers separated by the membranes. Refrigerant enters the inlet and passes through the plurality of layers prior to exiting the container via the outlet.

7 Claims, 2 Drawing Sheets

FILTER FOR REMOVING CONTAMINANTS FROM REFRIGERANT

The present invention relates to a filter for removing contaminants from refrigerant.

BACKGROUND OF THE INVENTION

In order to recycle refrigerant, contaminants, such as acid, oil and water, must be removed. A number of devices have been developed for recycling refrigerant; the critical component of which is the filtration system. The filtration systems used in the prior art have filters containing desiccants with known properties for drawing in moisture. The disadvantage of these filter systems is their limited rate of absorption; as a consequence only a small portion of the contaminants are captured as the refrigerant passes through the filter. The only way to achieve effective filtration using these filters is to pass the refrigerant through the filtration system repeatedly.

SUMMARY OF THE INVENTION

What is required is a filter for removing contaminants from refrigerant having enhanced absorption capabilities.

According to the present invention there is provided a filter for removing contaminants from refrigerant, which is comprised of an elongate closed container having a first end, a second end and an interior. An inlet is positioned adjacent to the first end. An outlet is positioned adjacent to the second end. Desiccant substantially fills the interior of the container. A plurality of liquid impervious membranes are positioned transversely within the interior of the container forming vapour barriers that slow down the rate of vapour flow. The desiccant is divided into a plurality of layers separated by the membranes. Refrigerant enters the inlet and passes through the plurality of layers prior to exiting the container via the outlet.

The above described filter configuration dramatically increases the effectiveness of the desiccant. Contaminants are intermixed with liquid refrigerant or carried as vapours in the gaseous refrigerant. The vapour barrier retards, if not completely preventing, the passage of contaminants. The trapped liquids or vapours are then absorbed in the desiccant. One type of vapour barrier the Applicant has used with beneficial results is a membrane made out of chamois.

Although beneficial results can be obtained through the use of the filter as described, even more beneficial results can be obtained by enhancing the absorption of oil by having a plurality of layers of oil absorbing material disposed within the interior of the container. One type of oil absorbing material the Applicant has used with beneficial results is a membrane of blown polypropylene.

Although beneficial results may be obtained from using filter as described, the filter is more effective and the life of the filter is prolonged if the amount of contaminants which pass through the filter is reduced. Even more beneficial results can therefore be obtained by using the filter in combination with a trap for liquid contaminants through which the refrigerant is first passed. The trap is comprised of a container having a top and a bottom. An inlet is positioned adjacent to the bottom of the container. An outlet for refrigerant in a gaseous state is positioned at the top of the container. An outlet for liquid contaminants is positioned at the bottom of the container.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
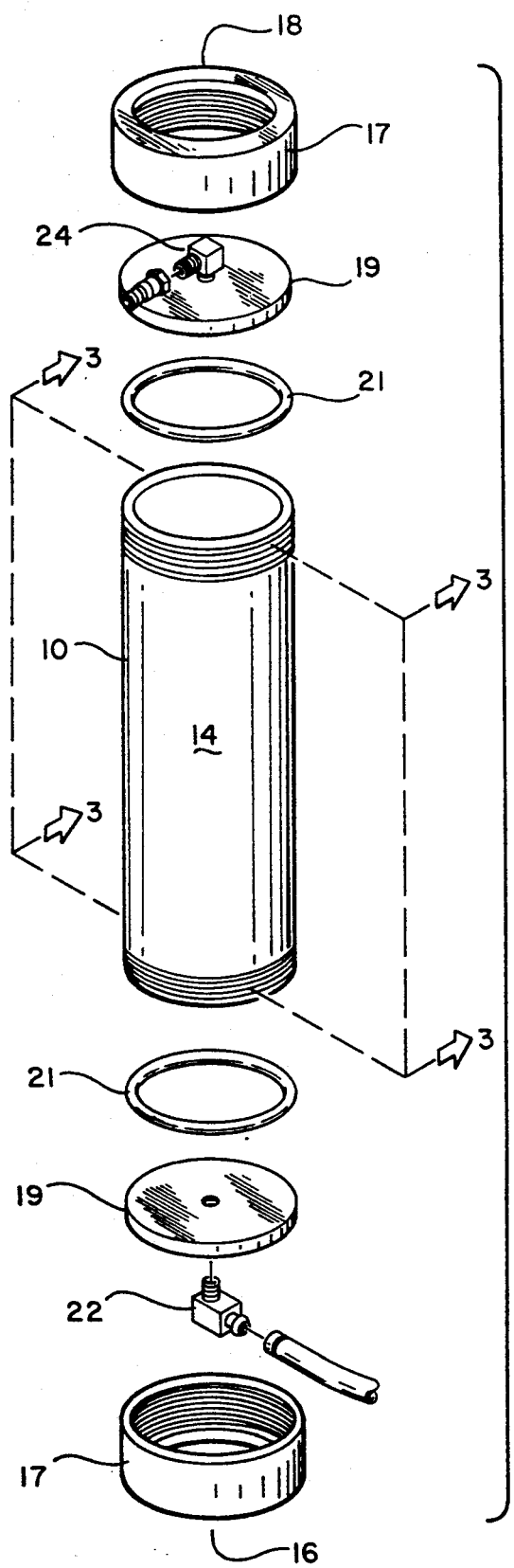
FIG. 1 is an exploded isometric view of a preferred embodiment of a filter constructed according to the teachings of the invention.

The preferred embodiment, a filter for removing contaminants from refrigerant generally identified by reference numeral 10, will now be described with reference to FIGS. 1 through 3. The Applicant prefers to use filter 10 in combination with a trap for removing liquid contaminants from refrigerant, which will also be described and is hereinafter generally identified by reference numeral 12.

Filter 10 consists of an elongate closed container 14 having a first end 16, a second end 18 and an interior 20. The Applicant prefers to orientate container 14 so it is positioned substantially vertically with first end 16 serving as a bottom and second end 18 as a top; however, container 14 can also be orientated horizontally. An inlet 22 is positioned at or adjacent to first end 16. An outlet 24 is positioned at or adjacent to second end 18. Referring to FIG. 1, first end 16 and second end 18 each are sealed using three components; an end cap 17, a center plate 19, and an O-ring seal 21. Plate 19 fits within end cap 17. End cap 17 threadedly engages container 14. O-ring seal 21 prevents leakage between end cap 17 and container 14. Desiccant 26 substantially fills interior 20 of container 14. A plurality of liquid impervious and vapour retarding chamois membranes 28 are positioned transversely within interior 20 of container 14. A plurality of oil absorbing blown polypropylene membranes 30 are similarly positioned transversely within interior 20 of container 14. Referring to FIG. 3, membranes 28 and 30 are maintained in position by spacer members 32. Spacer member interlock clamping membranes 28 or 30 between them. Membranes 28 and 30 divide desiccant 26 into a plurality of layers 34. Each of layers 34 is separated by either one of membranes 28 and 30 or both. The Applicant prefers that each of layers 34 is separated by both membranes 28 and 30.

Figure 2:
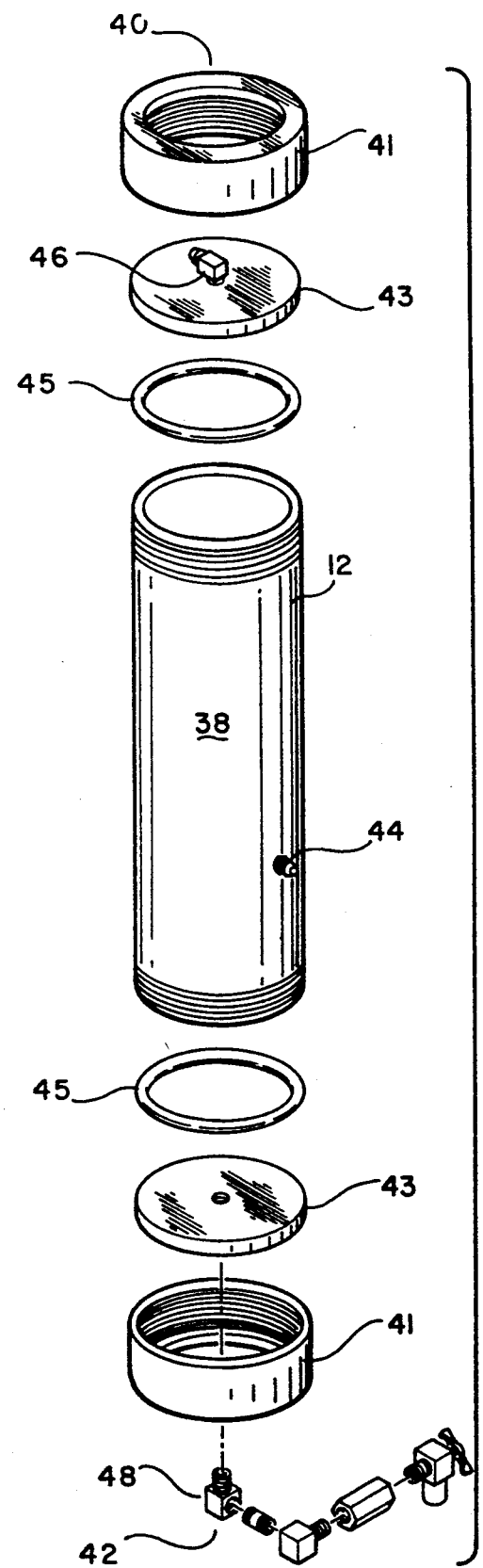
FIG. 2 is an exploded isometric view of a trap for liquid contaminants.
Figure 3:
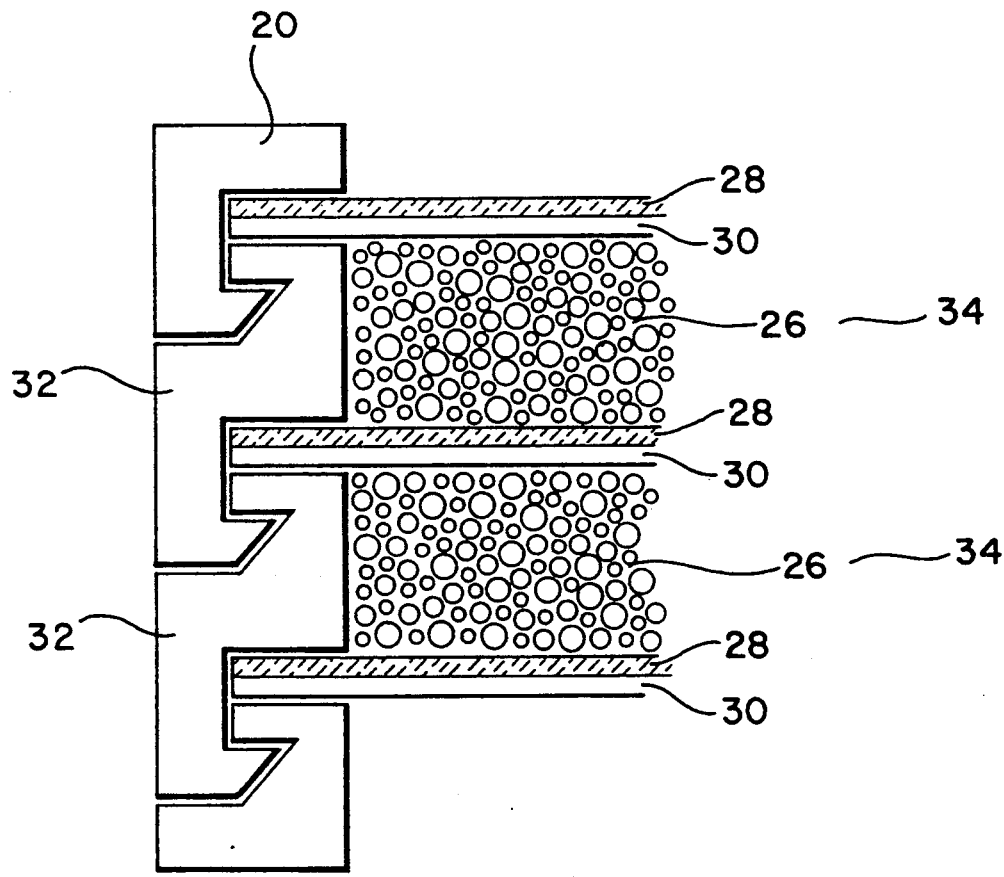
FIG. 3 is a partial longitudinal section view taken along section lines 3—3 of FIG. 1.

Referring to FIG. 2, trap 12 consists of a container 38 having a top 40 and a bottom 42. An inlet 44 is positioned adjacent to bottom 42 of container 38. An outlet 46 for refrigerant in a gaseous state is positioned at top 40 of container 38. An outlet 48 for liquid contaminants is positioned at bottom 42 of container 38. Referring to FIG. 2, top 40 and bottom 42 of trap 12, each are sealed using three components; an end cap 41, a center plate 43, and an O-ring seal 45. Plate 43 fits within end cap 41. End cap 41 threadedly engages container 38. O-ring seal 45 prevents leakage between end cap 41 and container 38.

The use and operation of filter 10 and trap 12 will now be described with reference to FIGS. 1 through 3. Refrigerant starts to turns from a liquid state into a gaseous state as the temperature of the refrigerant rises.

Through the application of heat and the use of differential densities of fluids, a portion of the liquid contaminants, such as acid, water and oil, can be removed from the refrigerant by means of gravity prior to passing the refrigerant through filter 10. Passing refrigerant directly through filter 10 depending upon the quantity of contaminants could result in filter 10 becoming saturated necessitating frequent filter replacement. For this reason the Applicant prefers as a preliminary step to pass the refrigerant through trap 12. As refrigerant enters inlet 44 the heavy liquid contaminants remain near the bottom of container 38 where they can be drained via liquid outlet 48. The refrigerant in a gaseous state rises to top 40 of container 38 where it is removed via refrigerant outlet 46. There is nothing sophisticated about trap 12 it works on fundamental principles of the differential densities between the liquid contaminants and the gaseous refrigerant. The refrigerant which is removed from refrigerant outlet 46 remains contaminated with contaminants which are carried by the gaseous refrigerant in the form of vapour. To complete the "decontamination" process the refrigerant is then passed through filter 10. Refrigerant enters container 14 of filter 10 through inlet 22 at first end 16, which as previously stated is generally the bottom. The gaseous refrigerant passes through plurality of layers 34 of desiccant 26 prior to exiting container 14 via outlet 24 at second end 18, which as previously stated is generally the top. Desiccant 26 is divided into layers by membranes 28 and 30. It is these membranes which provide filter 10 with its superior absorption ability. Membrane 28 is a liquid impervious vapour barrier which also retards the passage of vapour through desiccant 26. Desiccant has the inherent affinity for or ability to absorb moisture. By slowing down the rate of vapour flow the desiccant is provided with a greater opportunity to perform its intended function. Desiccant 26 can absorb oil, however, the Applicant has determined that blown polypropylene is more effective at absorbing oil and does so at a faster rate. The Applicant has also found that placing blown polypropylene in the form of a membrane, such as membrane 30, is a convenient way to introduce this oil absorbing material into filter 10. These membranes are referred to as melt-blown polypropylene absorbents. The passage of oil carried in vapour form is retarded by membrane 28 and then absorbed by membrane 30 and desiccant 26. Acids present in the refrigerant tend to cling to the oil, consequently as the oil is removed the acids are removed also. As the refrigerant passes through layer after layer 34 fewer and fewer contaminants remain. The effectiveness of filter 10 depends upon how many of layers 34 through which the refrigerant passes prior to exiting outlet 24. The Applicant has found that decontamination of the refrigerant to industry standards can be achieved by using 16 pairs of filters 28 and 30, to divide desiccant 26 into 15 of layers 34. With 15 to 20 layers decontamination can be achieved by a single pass through trap 12 and filter 10, depending upon the extent of contamination. With a fewer number of layers filter 10 still gives improved performance, however a second or third pass through filter 10 may be required.

Once desiccant 26 in filter 10 is thoroughly contaminated filter 10 will no longer function. A visual examination of desiccant 26 easily reveals whether contamination has occurred as "clean" desiccant is white and as it becomes contaminated it turns brown. Due to the multiple layers 34 of desiccant 26, filter 10 will tend to become contaminated layer by layer starting at first end 16. The Applicant has found that by making container 14 of transparent polypropylene, a visual inspection may readily be made. This material has the further characteristic of being acid resistant.

It will be apparent to one skilled in the art that the higher the temperature the greater will be the pressure of the refrigerant as it passes through the system. Filter 10 has been tested with successful results at 50 degrees fahrenheit, 70 degrees and 120 degrees in UL tests required for industry certification. It will be apparent to one skilled in the art that the filter as described provides a dramatic improvement over results attainable with filters known in the industry. It will finally be apparent to one skilled in the art that modifications may be made to the preferred embodiment without departing from the spirit and scope of the invention.

The embodiments of the invention in which an exclusive property or privilege is claimed are defined as follows:

1. A filter for removing contaminants from refrigerant, comprising:
   a. an elongate closed container having a first end, a second end and an interior;
   b. an inlet positioned adjacent to the first end;
   c. an outlet positioned adjacent to the second end;
   d. desiccant substantially filling the interior of the container; and
   e. a plurality of liquid impervious and vapour flow retarding membranes positioned transversely within the interior of the container, such that the desiccant is divided into a plurality of layers separated by membranes and refrigerant enters the inlet and passes through the plurality of layers prior to exiting the container via the outlet.

2. The filter for removing contaminants from refrigerant as defined in claim 1, said membrane being of a chamois material.

3. The filter for removing contaminants from refrigerant as defined in claim 1, having a plurality of layers of oil absorbing material disposed within the interior of the container.

4. The filter for removing contaminants from refrigerant as defined in claim 3, the oil absorbing material being blown polypropylene.

5. The filter for removing contaminants from refrigerant as defined in claim 1, the container being transparent thereby permitting a visual inspection to be made of the layers of desiccant.

6. A filter for removing contaminants from refrigerant, comprising:
   a. a transparent elongate closed container having a first end, a second end and an interior;
   b. an inlet positioned adjacent to the first end;
   c. an outlet positioned adjacent to the second end;
   d. desiccant substantially filling the interior of the container;
   e. a plurality of liquid impervious and vapour flow retarding chamois membranes positioned transversely within the interior of the container; and f. a plurality of oil absorbing blown polypropylene membranes positioned transversely within the interior of the container, such that the desiccant is divided into a plurality of layers separated by membranes and refrigerant enters the inlet and passes through the plurality of layers prior to exiting the container via the outlet.

7. In combination:

a. a trap for removing liquid contaminants from refrigerant, comprising:
   i. a container having a top and a bottom;
   ii. an inlet adjacent to the bottom of the container;
   iii. an outlet for refrigerant in a gaseous state at the top of the container;
   iv. an outlet for liquid contaminants at the bottom of the container; and
b. a filter for removing contaminants from refrigerant, comprising:
   i. a transparent elongate closed container having a first end, a second end and an interior;
   ii. an inlet positioned adjacent to the first end;
   iii. an outlet positioned adjacent to the second end;
   iv. desiccant substantially filling the interior of the container;
   v. a plurality of liquid impervious and vapour flow retarding chamois membranes positioned transversely within the interior of the container; and
   vi. a plurality of oil absorbing blown polypropylene membranes positioned transversely within the interior of the container, such that the desiccant is divided into a plurality of layers separated by membranes and refrigerant enters the inlet and passes through the plurality of layers prior to exiting the container via the outlet.

* * * * *